United States Patent [19]

Camuffo

[11] Patent Number: 5,040,917
[45] Date of Patent: Aug. 20, 1991

[54] DEVICE FOR FIXING MECHANICAL PARTS TO THE BODY OF A MOTOR VEHICLE

[75] Inventor: Sergio Camuffo, Turin, Italy

[73] Assignee: Fiat Auto S.p.A., Turin, Italy

[21] Appl. No.: 501,053

[22] Filed: Mar. 29, 1990

[30] Foreign Application Priority Data

Mar. 30, 1989 [IT] Italy .................. 67223 A/89

[51] Int. Cl.⁵ ............................................ F16B 39/22
[52] U.S. Cl. .................. 403/408.1; 411/338
[58] Field of Search ............ 403/408.1, 406.1, 388, 403/380, 286, 405.1, 407.1; 411/339, 338, 383, 171, 353, 352

[56] References Cited

U.S. PATENT DOCUMENTS

| | | | |
|---|---|---|---|
| 2,915,152 | 12/1959 | Graham | 403/408.1 X |
| 3,271,058 | 9/1966 | Anderson | 411/339 X |
| 3,603,626 | 9/1971 | Whiteside | 403/408.1 |
| 4,238,165 | 12/1980 | Wagner | 403/408.1 |
| 4,312,145 | 1/1982 | Lukavich | 411/338 X |
| 4,334,599 | 6/1982 | Ritsema et al. | 403/408.1 X |
| 4,647,264 | 3/1987 | Pamer et al. | 411/338 |
| 4,787,793 | 11/1988 | Harris | 403/408.1 X |
| 4,850,771 | 7/1989 | Hurd | 403/408.1 X |
| 4,921,371 | 5/1990 | Boiraeu et al. | 403/408.1 |

*Primary Examiner*—Peter M. Cuomo
*Attorney, Agent, or Firm*—Sughrue, Mion, Zinn, Macpeak & Seas

[57] ABSTRACT

A device is described for fixing to the floor of a motor-vehicle body, by screwing from above, a mechanical part which has previously been brought up to the floor from below. The mechanical part to be fixed carries at least one locating element which engages a corresponding hole formed in the body. The locating element has a threaded hole which is engaged by a screw on which the smaller-diameter portion of a sleeve can slide. The sleeve has a larger-diameter portion which is adapted to fit over the outer surface of that part of the locating element which projects through the corresponding locating hole in order to facilitate the centering and insertion of the screw in the threaded hole in the locating element.

4 Claims, 1 Drawing Sheet

DEVICE FOR FIXING MECHANICAL PARTS TO THE BODY OF A MOTOR VEHICLE

BACKGROUND OF THE INVENTION

The present invention relates to a device for fixing to the floor of a motor-vehicle body, by screwing from above, a mechanical part which has previously been brought up to the floor from below.

A tendency has developed recently in the art to preassemble the mechanical units of a motor vehicle, usually by mounting the various parts on preassembly subframes, and then to mount the subframes carrying the preassembled units on the motor vehicle body by means of automatic equipment. An example of this mode of production which relates to a rear suspension unit mounted on the floor of the motor-vehicle body from below, is described in the prior Italian Patent Application No. 68092-A/88 filed by the same Applicant and designating the same inventor as the present Application. In this mode of production, the preassembled unit is fixed under the floor of the motor-vehicle body by screwing from below with the aid of automatic screwing devices. Because of the particular shape and size of the structure to be fixed, however, some of the fixing points of the preassembled unit may have to be screwed to the body from above, that is, from inside the motor-vehicle body, instead of from below, and this may be difficult to carry out with automatic equipment. Moreover, the mechanical parts are sometimes mounted on box elements forming part of the body and this can make them even more difficult to fix, taking into account the need to avoid the risk of deformation or local weakening of the box element. taking into account the need to avoid the risk of deformation or local weakening of the box element.

SUMMARY OF THE INVENTION

In order to resolve all the aforesaid problems simply, the subject of the present invention is a device for fixing to the floor of a motor-vehicle body, by screwing from above, a mechanical part which has previously been brought up to the floor from below, characterised by the combination of the following characteristics:

a) the mechanical part to be fixed carries at least one locating element which engages a corresponding hole formed in the body;

b) the locating element has a threaded hole;

c) the fixing device comprises:

-a screw adapted to engage the threaded hole in the locating element, and

-a sleeve having a first, smaller-diameter portion mounted slidably on the screw with the head of the screw bearing on its end, and a second, larger-diameter portion adapted to fit over the outer surface of that part of the locating element which projects through the corresponding locating hole so as to facilitate the centering and insertion of the screw in the threaded hole in the locating element.

The locating element may be constituted, for example, by a peg the head of which is welded to the mechanical part to be fixed according to a technique known in applications in which locators have to be provided for the mounting of a preassembled unit on the body of the motor vehicle. Moreover, the fixing device preferably includes a resilient ring which is fitted on the shank of the screw to prevent the accidental disengagement of the screw from the sleeve.

BRIEF DESCRIPTION OF THE DRAWINGS

Further characteristics and advantages will become clear from the description which follows with reference to the appended drawings, provided by way of non-limiting example, in which.

DETAILED DESCRIPTION OF THE INVENTION

Figure 1:
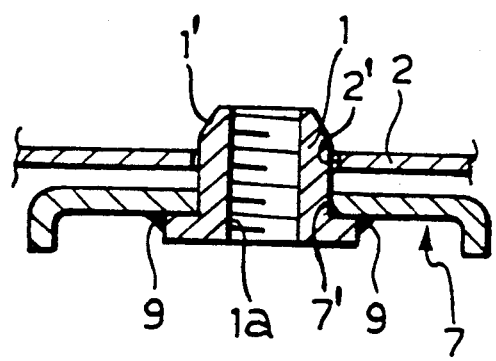
FIG. 1 shows in section a detail of the mechanical part to be fixed, provided with a locating peg engaged in a corresponding locating hole in part of the floor of a motor-vehicle body.

In the drawings, a mechanical part 7 (for example, an element with a cross member on which a rear suspension unit has been preassembled—see the Applicant's patent application No. 68092-A/88) is to be brought up to the floor 2 of the motor-vehicle body from below and fixed to the floor by screwing from above. The part 7 carries at least one locating element 1 which, in the embodiment illustrated, is constituted by a locating peg with a body which is inserted through a hole 7' in the part 7 and a head which is fixed to the part 7 by welding 9. When the part 7 is mounted under the floor 2 of the body, the portion of the locating peg 1 which projects from the part 7 engages a locating hole 2' formed in the floor 2. The free end of the locating peg 1 which projects above the floor 2—still with reference to the particular embodiment shown—has a circumferential chamfer 1'.

Figure 2:
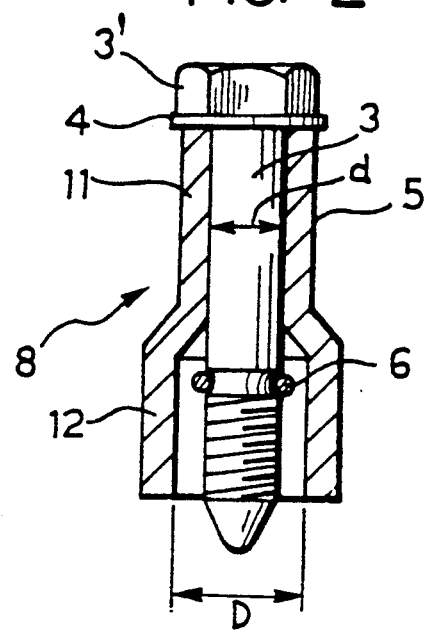
FIG. 2 is a sectional view of the fixing device according to the invention.
Figure 3:
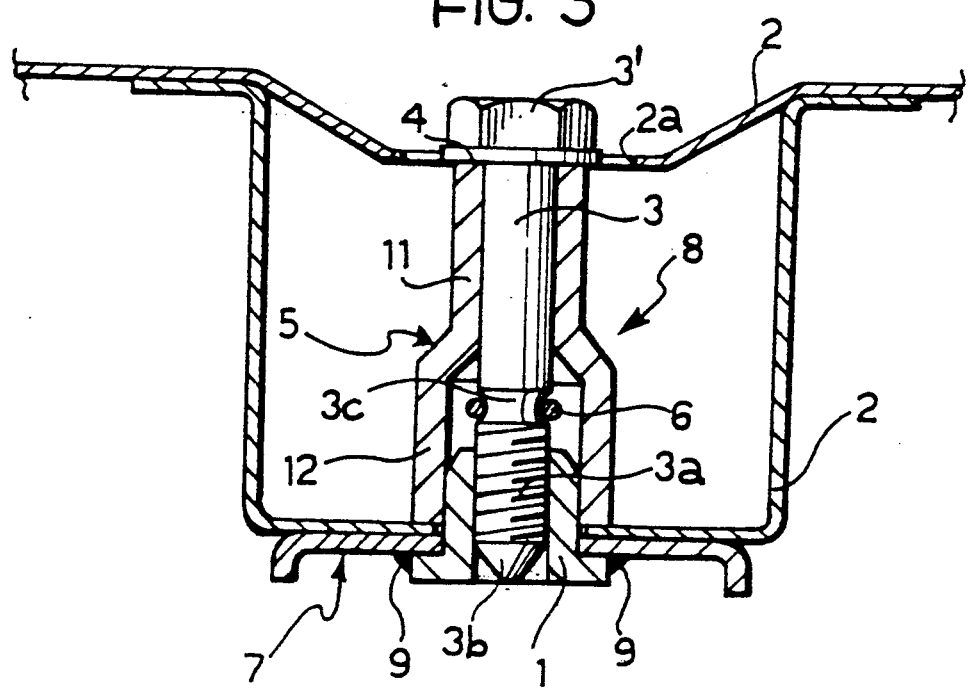
FIG. 3 is a sectional view showing the mechanical part mounted on the floor of the motor-vehicle body by means of the device of FIG. 2.

FIG. 3 shows the portion of the floor 2 to which the part 7 is to be fixed in greater detail. As can be seen, in the embodiment shown, the part 7 is fixed to the lower wall of a box element. The fixing device according to the invention, generally indicated 8, (see also FIG. 2) includes a screw 3 with a threaded end portion 3a terminating in a conical point 3b. The threaded portion 3a is intended to be screwed into the threaded hole 1a in the locating peg 1. A sleeve, indicated 5, has a first, smaller-diameter portion 11 mounted slidably on the unthreaded part of the shank of the screw 3 and a second, larger-diameter portion 12 (the diameters of the two portions are indicated d and D respectively in the drawings). The head 3' of the screw 3 abuts the free end surface of the smaller-diameter portion 11 of the sleeve 5 with the interposition of a washer 4. The shank of the screw 3 also has a circumferential groove 3c in which a resilient split ring 6 to prevent the accidental disengagement of the screw 3 from the sleeve 5.

FIG. 3 clearly shows the operating principle of the device 8 according to the invention: after the mechanical part 7 has been positioned adjacent the box element 2 from below by the insertion of the locating peg 1 in the locating hole 2', the device 8 is fitted into the cavity of the body element 2 from above by being passed through a hole 2a (FIG. 3) in the upper wall of the box element. The larger-diameter portion 12 of the sleeve 5 fits over the outer surface of that part of the locating peg 1 which projects through the hole 2' so as to facilitate the centering and insertion of the screw 3 in the threaded hole in the locating peg 1. The chamfer 1' of the locating peg facilitates the fitting of the sleeve over it. At the same time, the conical point 3b of the screw facilitates its fitting in the threaded hole 1a.

The device according to the invention is particularly suitable for fixing mechanical parts to box elements which form parts of motor-vehicle bodies, as shown in FIG. 3, but its use is not of course limited exclusively to box parts.

Another characteristic of the solution according to the invention is that the same locating pegs 1 as are normally used for the mounting of preassembled subassemblies are also used as engagement elements for fixing screws.

The fixing achieved by the device according to the invention provides a good distribution of the loading of the bolts between the connected elements by virtue of the wide annular coupling surface between the larger-diameter portion of the sleeve 5 and the fixed parts. Moreover, good resilience under tension is achieved by virtue of the overall length of the screw.

Naturally, the principle of the invention remaining the same, the forms of embodiment and details of construction may be varied widely with respect to those described and illustrated purely by way of example.

What is claimed is:

1. A device for fixing to a floor of a motor-vehicle body, by securing from above, a mechanical part which has previously been brought up to the floor below, wherein:

a) the mechanical part being fixed carries at least one locating element and the body defines a corresponding locating hole for engagement by the locating element;

b) the locating element comprising a peg-like member having an elongated tubular portion with a threaded hole and a flange at one end welded to said mechanical part; and c) a screw having a head and a shank with a threaded end portion spaced from said head adapted to engage the threaded hole in the locating element, and a sleeve having a first, smaller-diameter portion mounted slidably on the shank of said screw with the head of the screw bearing on its end, and a second, larger-diameter portion extending over said threaded end portion in spaced relation thereto and adapted to fit over the outer surface of said tubular portion of the locating element which projects through the corresponding locating hole so as to facilitate the centering and insertion of the screw in the threaded hole in the locating element.

2. A fixing device according to claim 1, wherein the device includes a resilient ring which is fitted onto the shank of the screw to prevent the accidental disengagement of the screw from the sleeve.

3. A fixing device according to claim 1, wherein the peg has a circumferential chamfer at its free end for facilitating the fitting of the larger-diameter portion of the sleeve.

4. A fixing device according to claim 1, wherein a washer is interposed between the head of the screw and the end surface of the smaller-diameter portion of the sleeve.

* * * * *